United States Patent
Maruyama

(10) Patent No.: US 10,554,666 B2
(45) Date of Patent: *Feb. 4, 2020

(54) INFORMATION PROCESSING DEVICE, INFORMATION PROCESSING SYSTEM, INFORMATION PROCESSING METHOD, AND NON-TRANSITORY COMPUTER-READABLE MEDIUM

(71) Applicant: FUJI XEROX CO., LTD., Tokyo (JP)

(72) Inventor: Yasuhiro Maruyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,159

(22) Filed: May 6, 2019

(65) Prior Publication Data

US 2019/0327240 A1 Oct. 24, 2019

Related U.S. Application Data

(63) Continuation of application No. 15/217,814, filed on Jul. 22, 2016, now Pat. No. 10,291,623.

(30) Foreign Application Priority Data

Mar. 11, 2016 (JP) .................. 2016-048402

(51) Int. Cl.
*H04L 29/06* (2006.01)
*G06F 21/60* (2013.01)

(52) U.S. Cl.
CPC .......... *H04L 63/102* (2013.01); *G06F 21/608* (2013.01)

(58) Field of Classification Search
CPC .............................. H04L 63/102; G06F 21/608
(Continued)

(56) References Cited

U.S. PATENT DOCUMENTS 8,627,075 B2 * 1/2014 Ikeda .................. H04B 5/02
713/168
2012/0092698 A1 * 4/2012 Osada .................. G06F 21/608
358/1.14

(Continued)

FOREIGN PATENT DOCUMENTS

JP 2011-242992 A 12/2011
JP 2013-178768 A 9/2013

(Continued)

OTHER PUBLICATIONS

Jan. 2, 2018 Office Action issued in U.S. Appl. No. 15/217,814.
Aug. 15, 2018 Office Action issued in U.S. Appl. No. 15/217,814.

*Primary Examiner* — Eleni A Shiferaw
*Assistant Examiner* — Angela R Holmes
(74) *Attorney, Agent, or Firm* — Oliff PLC

(57) ABSTRACT

An information processing device includes: a first reception unit that receives first information indicating a storage location of a document to be printed; a first transmission unit that uses the first information to generate an authorization request, generates corresponding second information, and transmits the authorization request and the second information to a terminal used by a sender of the first information; a second reception unit that receives a corresponding authorization code; a controller that uses the authorization code to acquire an access token, and controls storage of the access token, the second information, and the first information in association with each other; and a second transmission unit that, if the second information is received from an image processing device, uses the corresponding access token and information indicating a storage location to acquire a document in the storage location, and transmits the document to the image processing device.

6 Claims, 7 Drawing Sheets

(58) Field of Classification Search
USPC .............................................................. 726/4
See application file for complete search history.

(56) References Cited

U.S. PATENT DOCUMENTS

| | | | | |
|---|---|---|---|---|
| 2013/0222827 | A1* | 8/2013 | Watanabe | ............... G06F 3/122 |
| | | | | 358/1.13 |
| 2013/0247117 | A1* | 9/2013 | Yamada | ................. G08C 17/02 |
| | | | | 725/93 |
| 2014/0168696 | A1 | 6/2014 | Matsuhara et al. | |
| 2016/0337351 | A1* | 11/2016 | Spencer | ............. H04L 63/0876 |

FOREIGN PATENT DOCUMENTS

| | | |
|---|---|---|
| JP | 2014-120975 A | 6/2014 |
| JP | 2015-103917 A | 6/2015 |

\* cited by examiner

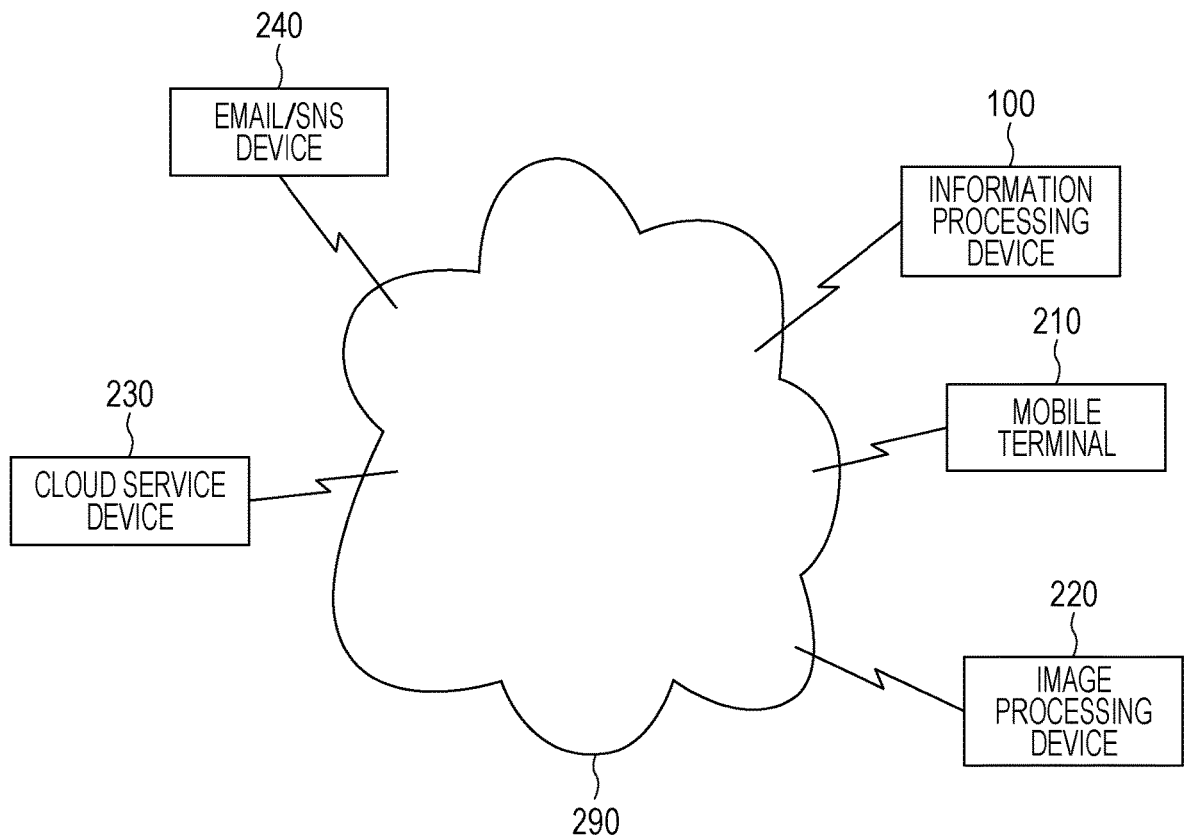

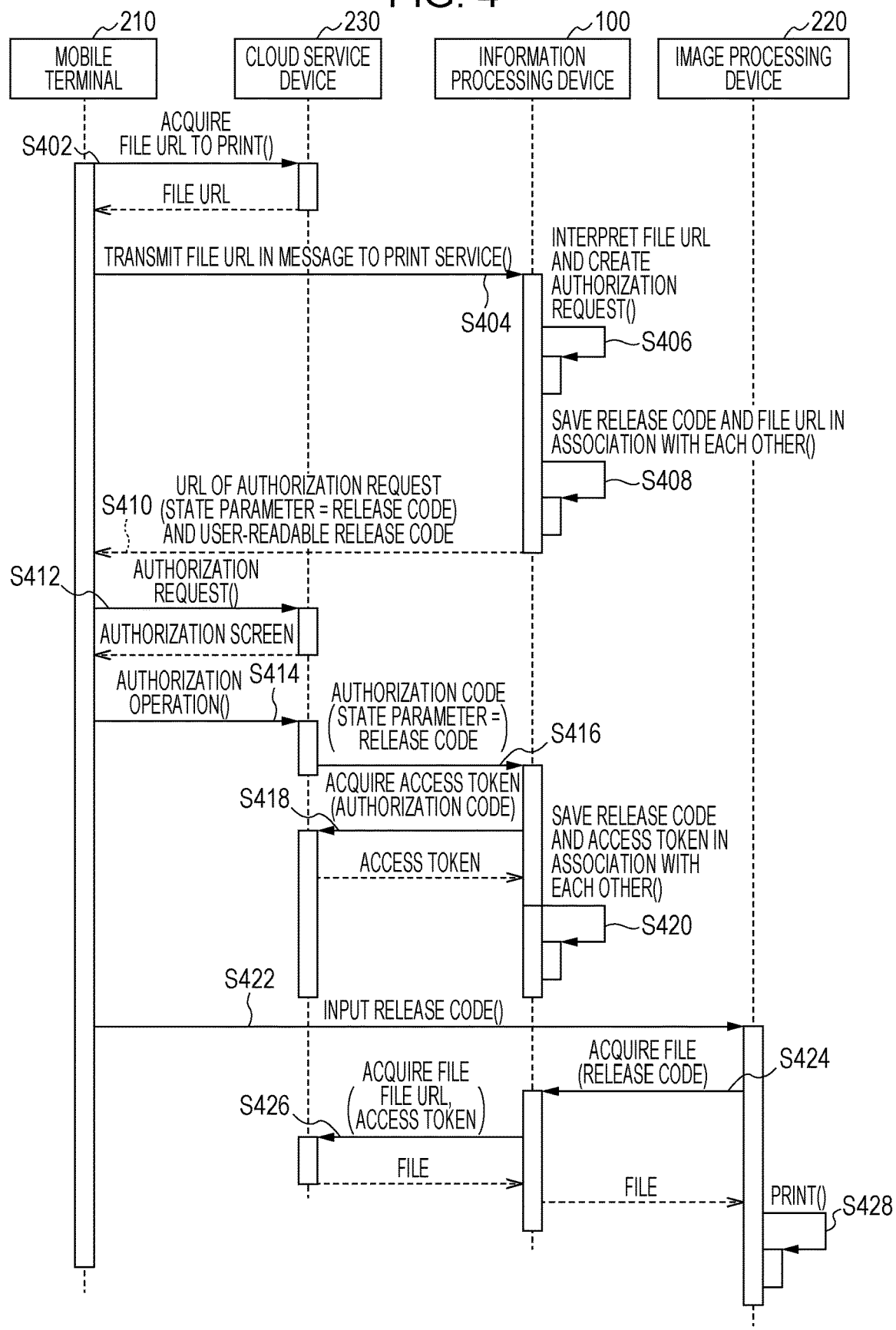

INFORMATION PROCESSING DEVICE, INFORMATION PROCESSING SYSTEM, INFORMATION PROCESSING METHOD, AND NON-TRANSITORY COMPUTER-READABLE MEDIUM

CROSS-REFERENCE TO RELATED APPLICATIONS

This is a Continuation of application Ser. No. 15/217,814 filed Jul. 22, 2016, which claims the benefit of Japanese Patent Application No. 2016-048402 filed Mar. 11, 2016. The disclosure of the prior applications are hereby incorporated by reference herein in their entirety.

BACKGROUND

Technical Field

The present invention relates to an information processing device, an information processing system, an information processing method, and a non-transitory computer-readable medium.

SUMMARY

According to an aspect of the invention, there is provided an information processing device including: a first reception unit that receives first information indicating a storage location of a document to be printed; a first transmission unit that uses the first information to generate an authorization request, generates second information corresponding to the authorization request, and transmits the authorization request and the second information to a terminal used by a sender of the first information; a second reception unit that receives an authorization code corresponding to the authorization request; a controller that uses the authorization code to acquire an access token, and controls storage of the access token, the second information, and the first information in association with each other; and a second transmission unit that, if the second information is received from an image processing device, uses the access token corresponding to the second information and information indicating a storage location to acquire a document in the storage location, and transmits the document to the image processing device.

BRIEF DESCRIPTION OF THE DRAWINGS

An exemplary embodiment of the present invention will be described in detail based on the following figures, wherein:

FIG. 2 is an explanatory diagram illustrating an exemplary system configuration utilizing an exemplary embodiment;

FIG. 3 is an explanatory diagram illustrating an exemplary data structure of an access token saving table;

FIG. 4 is a flowchart illustrating an example of a process according to an exemplary embodiment;

DETAILED DESCRIPTION

Hereinafter, an exemplary embodiment related to realizing the present invention will be described by way of example on the basis of the drawings.

Figure 1:
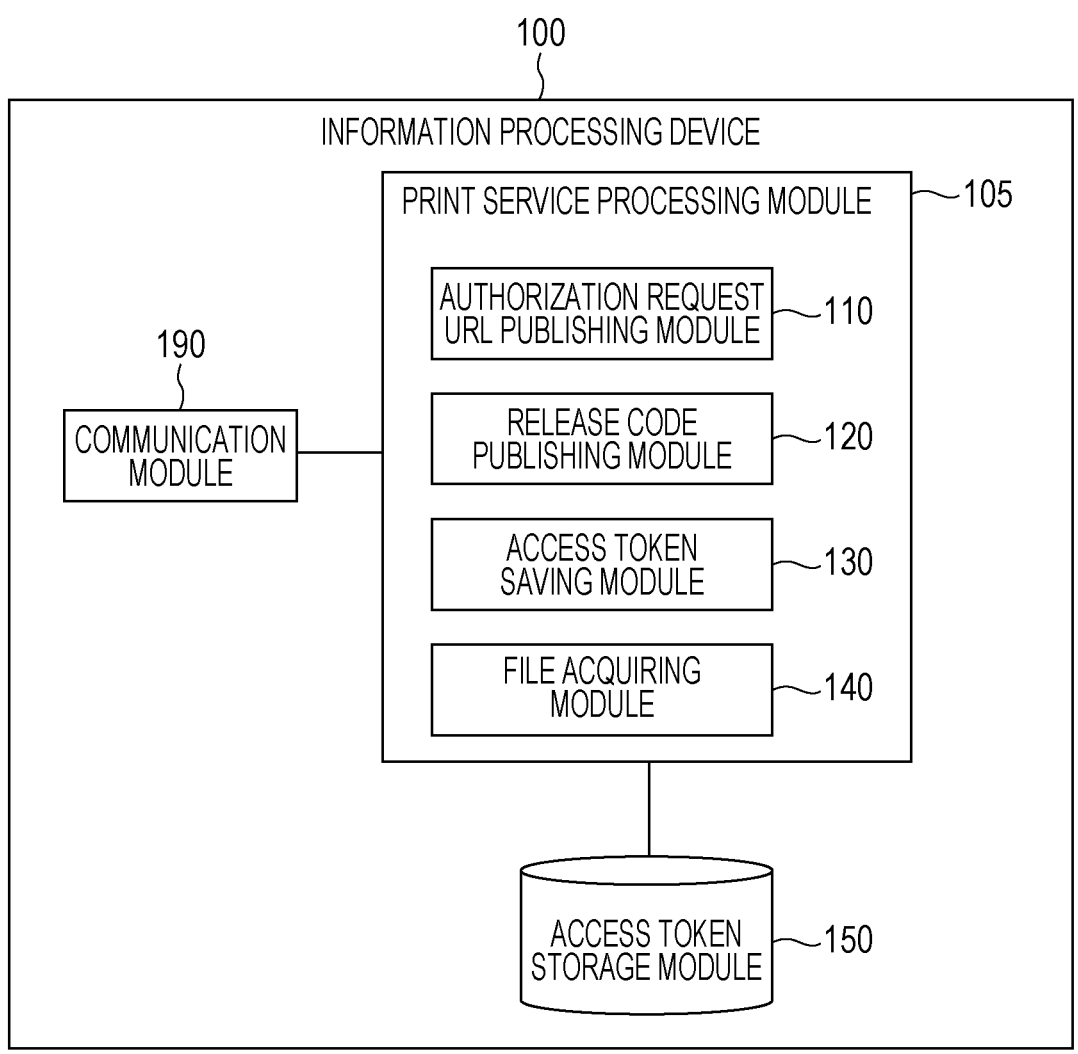
FIG. 1 is a schematic module configuration diagram for an exemplary configuration according to an exemplary embodiment.

FIG. 1 illustrates a schematic module configuration for an exemplary configuration according to the exemplary embodiment.

Note that the term module refers to components such as software (computer programs) and hardware which are typically capable of being logically separated. Consequently, the term module in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, in accordance with conditions or states at that time, or in accordance with conditions or states up to that time. In the case of multiple "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted.

Also, the terms "system" and "device" not only encompass configurations in which multiple computers, hardware, or devices are connected by a communication medium such as a network (including connections that support 1-to-1 communication), but also encompass configurations realized by a single computer, hardware, or device. The terms "device" and "system" are used interchangeably. Obviously, the term "system" does not include merely artificially arranged social constructs (social systems).

Also, every time a process is conducted by each module or every time multiple processes are conducted within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include a hard disk, random access memory (RAM), an auxiliary or external storage medium, a storage device accessed via a communication link, and a register or the like inside a central processing unit (CPU).

An information processing device 100 according to the exemplary embodiment is a device that provides a print service, and as illustrated by the example of FIG. 1, includes a print service processing module 105, an access token storage module 150, and a communication module 190.

The print service processing module 105 includes an authorization request URL publishing module 110, a release code publishing module 120, an access token saving module 130, and a file acquiring module 140, and is connected to the access token storage module 150 and the communication module 190. The print service processing module 105 provides the print service.

The authorization request URL publishing module 110 receives, via the communication module 190, first information indicating the storage location of a document to be printed (hereinafter also called a file). The first information may be a Uniform Resource Identifier (URI), for example, and more specifically, may be a Uniform Resource Locator). Herein, the storage location is taken to refer to a cloud service device 230 discussed later. Note that the print service processing module 105 receives the first information from a terminal used by a sender (for example, the mobile terminal 210 discussed later).

Next, the print service processing module 105 uses the first information to generate an authorization request.

Subsequently, the authorization request and second information generated by the release code publishing module 120 (hereinafter also called a release code) is transmitted to the terminal used by the sender who transmitted the first information.

Specifically, for example, the authorization request URL publishing module 110 identifies the cloud service device 230 from the URL sent from the mobile terminal 210, publishes the URL of the authorization request for the cloud service device 230, and replies to the mobile terminal 210.

In the authorization request, the release code published by the release code publishing module 120 is set in a state parameter.

Also, the destination to which the authorization flow is ultimately redirected is taken to be the URL of the information processing device 100 that performs the print service.

The release code publishing module 120 generates second information corresponding to an authorization request generated by the print service processing module 105.

Specifically, for example, the release code publishing module 120 publishes a release code as the second information. It is sufficient for the release code to be information corresponding to the authorization request, and may be a random number, for example. However, the release code may be an alphanumeric code approximately eight characters long, to enable manual input by the user. Additionally, a period of validity for the release code may also be set. This period is a period enabling a document to be printed, and thus may be of short duration.

The access token saving module 130 receives an authorization code corresponding to the authorization request. Note that the access token saving module 130 receives the authorization code from a document storage device that manages the storage location (for example, the cloud service device 230 discussed later).

Next, the access token saving module 130 uses the authorization code to acquire an access token from the cloud service device 230.

Subsequently, the access token saving module 130 performs control causing the access token to be saved in association with the second information and the first information.

Specifically, for example, the access token saving module 130 saves the release code, the file URL, and the access token in association with each other in the access token storage module 150. When the file URL is transmitted from the mobile terminal 210, the release code and the file URL are saved. When the access token is acquired from the authorization code, the access token is saved in association with the release code included in the authorization code.

When the second information is received from an image processing device, the file acquiring module 140 uses the access token corresponding to the second information and information indicating the storage location to acquire the document in the relevant storage location, and transmits the document to the image processing device.

Specifically, for example, from the release code included in a file acquisition request from an image processing device 220, the file acquiring module 140 acquires a file to be printed from the cloud service device 230, based on the access token and the URL of the file to be printed which are saved in the access token storage module 150, and replies to the image processing device 220 with the file to be printed.

The access token storage module 150 is connected to the print service processing module 105. The access token storage module 150 communicates with devices such as the mobile terminal 210, the image processing device 220, the cloud service device 230, and an email/SNS device 240 discussed later. Note that the access token storage module 150 may also be configured to communicate with the terminal used by the sender (the mobile terminal 210) over a social network or electronic mail used by the sender.

The communication module 190 is connected to the print service processing module 105. The communication module 190 stores information such as the access token from the access token saving module 130. For example, the communication module 190 stores an access token saving table 300. FIG. 3 is an explanatory diagram illustrating an exemplary data structure of the access token storage table 300. The access token saving table 300 includes a release code field 310, a file URL field 320, an access token field 330, and a creation time field 340. The release code field 310 stores the release code. The file URL field 320 stores the file URL corresponding to the release code. The access token field 330 stores the access token corresponding to the release code and the file URL. The creation time field 340 stores the time at which the release code or the access token was created (the time may be the year, month, day, hour, minute, second, fraction of a second, or some combination thereof).

FIG. 2 is an explanatory diagram illustrating an exemplary system configuration utilizing the present exemplary embodiment.

The information processing device 100, the mobile terminal 210, the image processing device 220, the cloud service device 230, and the email/SNS device 240 are connected to each other over a communication link 290. The communication link 290 may be wireless, wired, or a combination of the two, and may use a network such as the Internet or an intranet as a communication infrastructure, for example. Also, the functions provided by not only the cloud service device 230 but also the information processing device 100 and the email/SNS device 240 may also be realized as cloud services. The cloud service device 230 at least manages documents, and includes a function of what is called cloud storage. The mobile terminal 210 includes a communication function, and may be a device like a data communication terminal, such as a mobile phone (including a device such as a smartphone), a notebook PC (including a device such as a tablet PC), or a personal digital assistant (PDA), or be a device that includes a communication function, such as a game console, a navigation system, an information appliance, or a wearable computer. Note that although the mobile terminal 210 is illustrated as an example of a terminal used by the sender, the terminal may also be a stationary terminal such as a desktop PC insofar as a communication function is included.

The mobile terminal 210 acquires the URL of a file to be printed inside the cloud service device 230, using an application, a browser, or the like in response to a user operation.

In addition, from the URL of the authorization request transmitted from the information processing device 100, the mobile terminal 210 is able to perform an authorization operation in the browser with the email/SNS device 240. Additionally, the mobile terminal 210 is able to communicate messages such as electronic mail and social networking service (SNS) messages.

The email/SNS device 240 includes electronic mail, SNS messaging functions (such as Line or Facebook Messenger), or microblogging messaging functions (such as Twitter direct messages). Note that the user of the mobile terminal 210 has an established account on the email/SNS device 240, and is able to receive services provided by the information processing device 100. Specifically, the information processing device 100 also has an account on the email/SNS device 240, and communication between the user of the mobile terminal 210 and the information processing device 100 (also typically called chat) is possible.

The information processing device 100 has a function of communicating with devices such as the email/SNS device 240, and a function of receiving requests from the image processing device 220.

The image processing device 220 includes a user interface or communication equipment that receives a release code, a function of transmitting the release code to the information processing device 100 and acquiring a file, and a function of printing the file.

In the related art, the document to be printed sometimes is assumed to be a document stored internally in the mobile terminal 210. The case of printing a document residing in the cloud service device 230 may require first downloading the document locally (to the mobile terminal 210), and then uploading the document to the print service.

For this reason, it takes time until printing starts, and data bandwidth is wasted.

The information processing device 100 according to the present exemplary embodiment conducts a process for printing on the image processing device 220, without causing a document residing in the cloud service device 230 to be downloaded to the mobile terminal 210. In order for the information processing device 100 to acquire a document from the cloud service device 230, an access token prescribed by OAuth, for example, is acquired from the cloud service device 230. Additionally, user registration in the information processing device 100 is not necessary, and it is not necessary to install a dedicated print service application on the mobile terminal 210. Note that in the case of using OAuth, the mobile terminal 210 includes a browser able to handle OAuth flows, and the cloud service device 230 supports OAuth.

In addition, the information processing device 100 in this case is able to communicate messages such as electronic mail and SNS messages, and generates the URL of an authorization request (sets the release code in a state parameter) from a URL, saves the release code, the file URL, and the access token in association with each other, publishes the release code, and acquires a file from the cloud service device 230 based on a request from the image processing device 220.

An overview of the process (herein used solely as technical information to facilitate understanding of the technology) will now be described.

(1) The user sends, by electronic mail or SNS message, the URL of a file to be printed to the information processing device 100.

(2) The information processing device 100 interprets the URL, and replies with the URL of an authorization request for accessing the cloud service device 230. At this point, a release code is published, and set in a state parameter.

The release code is returned to the user separately in a readable format (a form visible to the eye).

The release code and the file URL are saved in association with each other.

(3) The user taps the URL of the authorization request, proceeds with the authorization flow, and after the authorization process is completed, an authorization code is redirected to the information processing device 100.

From the release code that was returned by being set in a state parameter, an access token acquirable from the authorization code is added to and saved with the release code and the file URL saved in (2) above.

(4) The image processing device 220 receives the release code from the user or the mobile terminal 210. Subsequently, a print process according to the following (5) is started.

(5) The image processing device 220 sends the release code to the information processing device 100, acquires the file to be printed, and prints the file.

FIG. 4 is a flowchart illustrating an exemplary process according to the exemplary embodiment.

In step S402, the mobile terminal 210 acquires the URL of a file to be printed from the cloud service device 230.

In step S404, the mobile terminal 210 transmits the file URL acquired in step S402 to the information processing device 100 by using a message directed at the print service.

In step S406, the information processing device 100 interprets the file URL to create an authorization request.

In step S408, the information processing device 100 saves the release code and the file URL in association with each other in the access token saving table 300.

In step S410, the information processing device 100 transmits the URL of the authorization request (with the release code set in a state parameter) and a user-readable release code to the mobile terminal 210. Note that the state parameter is as prescribed by OAuth, and if this state parameter is included in the URL of authorization request, the information processing device 100 is also able to acquire an authorization code with an included state parameter in step S416 discussed later. Additionally, the release code set in the state parameter is used to save the access token in the relevant row of the access token saving table 300 saved in step S408.

In step S412, the mobile terminal 210 transmits the authorization request to the cloud service device 230, and displays an authorization screen. Specifically, accessing the URL of the authorization request in response to a user operation corresponds to transmitting the authorization request, and as a result, an authorization screen is displayed in the browser.

In step S414, the mobile terminal 210 performs an authorization operation with respect to the cloud service device 230, in response to a user operation. Herein, the action to be authorized is the access, by the information processing device 100, to the file to be printed which resides in the cloud service device 230.

In step S416, the cloud service device 230 transmits an authorization code (with the release code set in a state parameter) to the information processing device 100.

In step S418, the information processing device 100 acquires an access token (authorization code) from the cloud service device 230.

In step S420, the information processing device 100 saves the release code and the access token in association with each other in the access token saving table 300.

In step S422, the mobile terminal 210 or the user of the mobile terminal 210 inputs the release code into the image processing device 220.

In step S424, the image processing device 220 transmits a file acquisition request (with the release code included) to the information processing device 100.

In step S426, the information processing device 100 uses the access token saving table 300 to extract the file URL and the access token corresponding to the release code acquired in step S424. The information processing device 100 uses the file URL and the access token to acquire the file to be printed from the cloud service device 230. Subsequently, the information processing device 100 transmits the file to the image processing device 220.

In step S428, the image processing device 220 prints the file.

Figure 5:
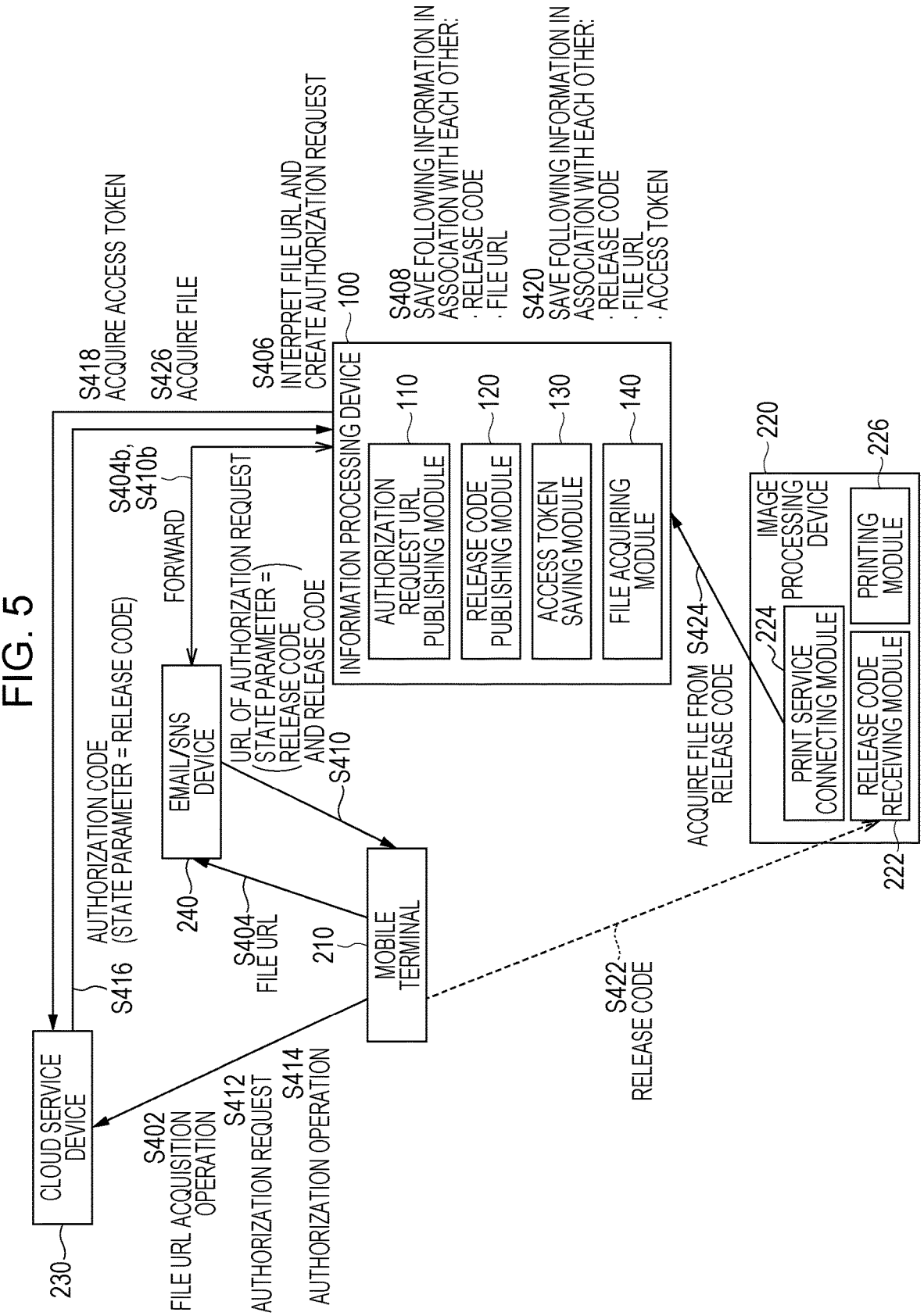
FIG. 5 is an explanatory diagram illustrating an example of a process according to an exemplary embodiment.

FIG. 5 is an explanatory diagram illustrating an example of a process according to the exemplary embodiment. FIG. 5 illustrates an example of the mobile terminal 210 and the information processing device 100 communicating via the email/SNS device 240, and conducting a process similar to the exemplary process illustrated in FIG. 4.

The mobile terminal 210 communicates with the cloud service device 230, and communicates with the information processing device 100 via the email/SNS device 240.

The cloud service device 230 communicates with the mobile terminal 210 and the information processing device 100.

The email/SNS device 240 intermediates between the mobile terminal 210 and the information processing device 100, and has a role of serving as what is called a portal site.

The information processing device 100 communicates with the cloud service device 230 and the image processing device 220, and communicates with the mobile terminal 210 via the email/SNS device 240.

The image processing device 220 communicates with the information processing device 100. In addition, regarding the receiving of the release code, the image processing device 220 may also conduct short-range wireless communication with the mobile terminal 210, or be operated by the user of the mobile terminal 210.

The image processing device 220 includes a release code receiving module 222, a print service connecting module 224, and a printing module 226.

The release code receiving module 222 receives the second information, namely the release code, by an operation performed by the sender, or from a terminal used by the sender (mobile terminal 210). Herein, the "operation performed by the sender" refers to the user performing an operation of typing in the release code on a device such as a keyboard or a touch panel provided on the image processing device 220, for example. Also, the method of receiving the release code "from a terminal used by the sender" may use short-range wireless communication. For example, a near field communication (NFC) function of the mobile terminal 210 may be used to transmit the release code received from the information processing device 100.

The print service connecting module 224 transmits the second information to the information processing device 100, and subsequently receives a document from the information processing device 100. In other words, the print service connecting module 224 acquires a document to be printed from the information processing device 100, based on the release code.

The printing module 226 prints the document received by the print service connecting module 224.

In step S404 illustrated in the example of FIG. 5, the mobile terminal 210 transmits the file URL to the email/SNS device 240 by using a message directed at the print service. The email/SNS device 240 forwards the file URL to the information processing device 100 (step S404b).

In step S410 illustrated in the example of FIG. 5, the information processing device 100 transmits the URL of the authorization request and the user-readable release code to the email/SNS device 240 (step S410b). The email/SNS device 240 transmits the URL of the authorization request and the user-readable release code to the mobile terminal 210.

Figure 6:
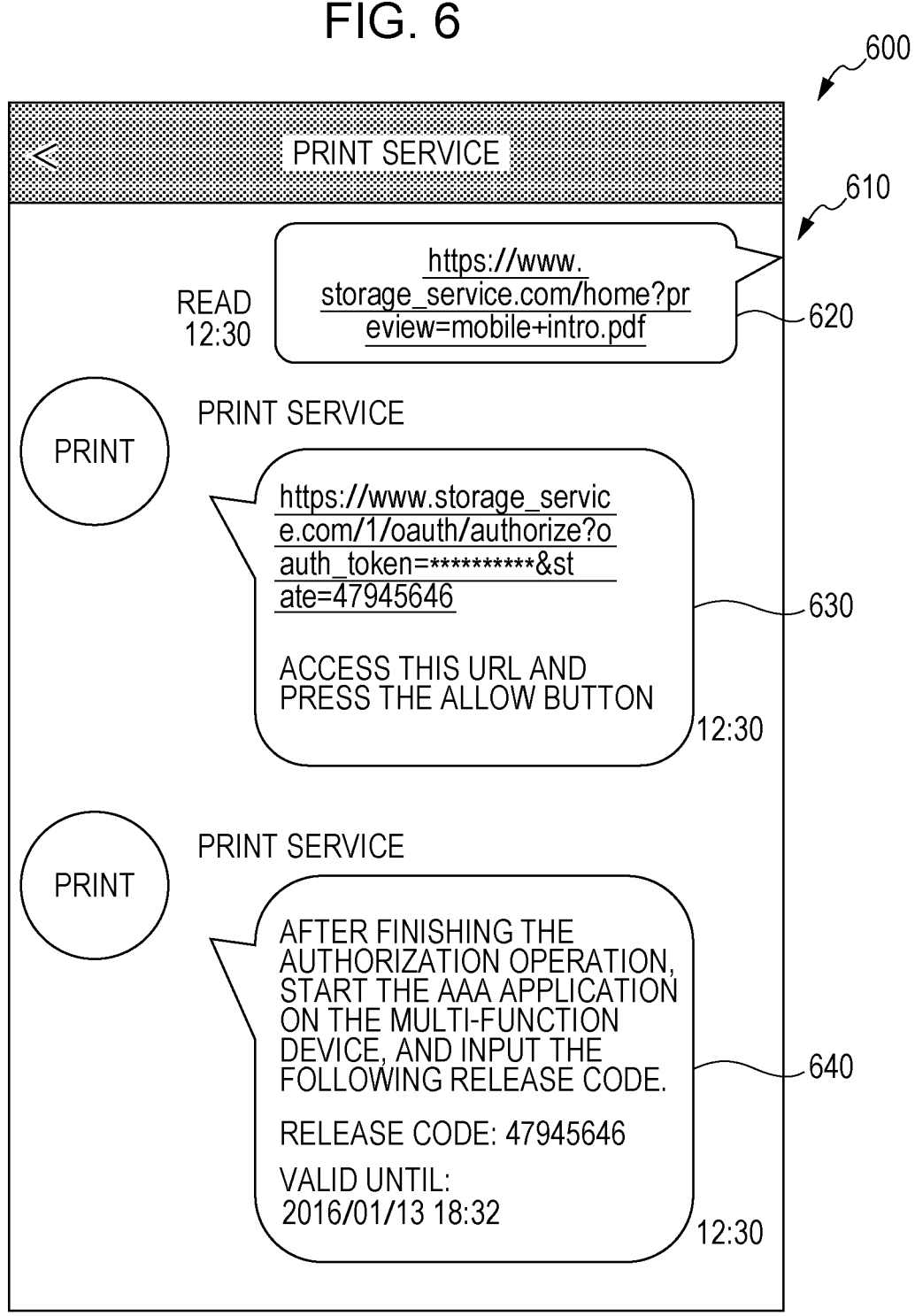
FIG. 6 is an explanatory diagram illustrating an example of a process according to an exemplary embodiment.

FIG. 6 is an explanatory diagram illustrating an example of a process according to the exemplary embodiment.

The mobile terminal 210 displays a print service provision screen 600 on a display device such as a liquid crystal display. On the print service provision screen 600, a conversation area 610 is displayed.

In the conversation area 610, a message 620, a message 630, and a message 640 are displayed as the communication content (chat) between the user of the mobile terminal 210 and the information processing device 100 (the print service).

The message 620 corresponds to step S404 illustrated in the example of FIG. 5. For example, "https://www.storage_service.com/home?preview=mobile+intro.p df" is displayed as the message 620. This is simply the URL that was acquired in step S402.

The message 630 and the message 640 correspond to step S410 illustrated in the example of FIG. 5.

For example, "https://www.storage_service.com/1/oauth/authorize?oauth_tok en=********&state=47945646" and "Access this URL and press the Allow button" are displayed as the message 630**. The URL displayed at this point adopts the format used by OAuth. Note that the final portion "state=47945646" indicates that a release code (47945646) has been set in the state parameter.

For example, "After finishing the authorization operation, start the AAA application on the multi-function device, and input the following release code.", "Release Code: 47945646", and "Valid Until: 2016 Jan. 13 18:32" are displayed as the message 640. The portion "Release Code:

47945646" is the release code made user-readable. This display portion is a display for the user of the mobile terminal 210 to type in the release code into the image processing device 220. Consequently, in the case in which the mobile terminal 210 transmits the release code to the image processing device 220 by short-range wireless communication, since it is sufficient for the mobile terminal 210 to extract the release code from the URL in the message 630, the display of the release code in the message 640 may also be omitted.

In the description of the foregoing exemplary embodiment, the URL discussed above specifies a document to be printed, but may also be taken to specify a storage location of a scanned document image. In this case, the URL pointing to a file means that the file is to be updated to a new version or replaced, for example. Meanwhile, the URL pointing to a folder means that the document image is to be stored in that folder, for example.

In this case, the print service processing module 105 receives first information indicating the storage location of the document to be scanned.

Subsequently, when the second information is received from the image processing device 220, the file acquiring module 140 uses the access token corresponding to the second information and information indicating the storage location to receive the document image from the image processing device 220, and transmits the document image to the relevant storage location.

In addition, the image processing device 220 receives the second information by an operation performed by the sender or from the terminal used by the sender, transmits the second information to the information processing device 100, scans the document image, and transmits the document image to the information processing device 100.

Obviously, in this case, the communication between the information processing device 100 and the mobile terminal 210 still may be conducted via the email/SNS device 240.

Also, devices such as the information processing device 100 and the image processing device 220 may be configured both to retrieve a document to be printed from the cloud service device 230, and to store a scanned document in the cloud service device 230.

Figure 7:
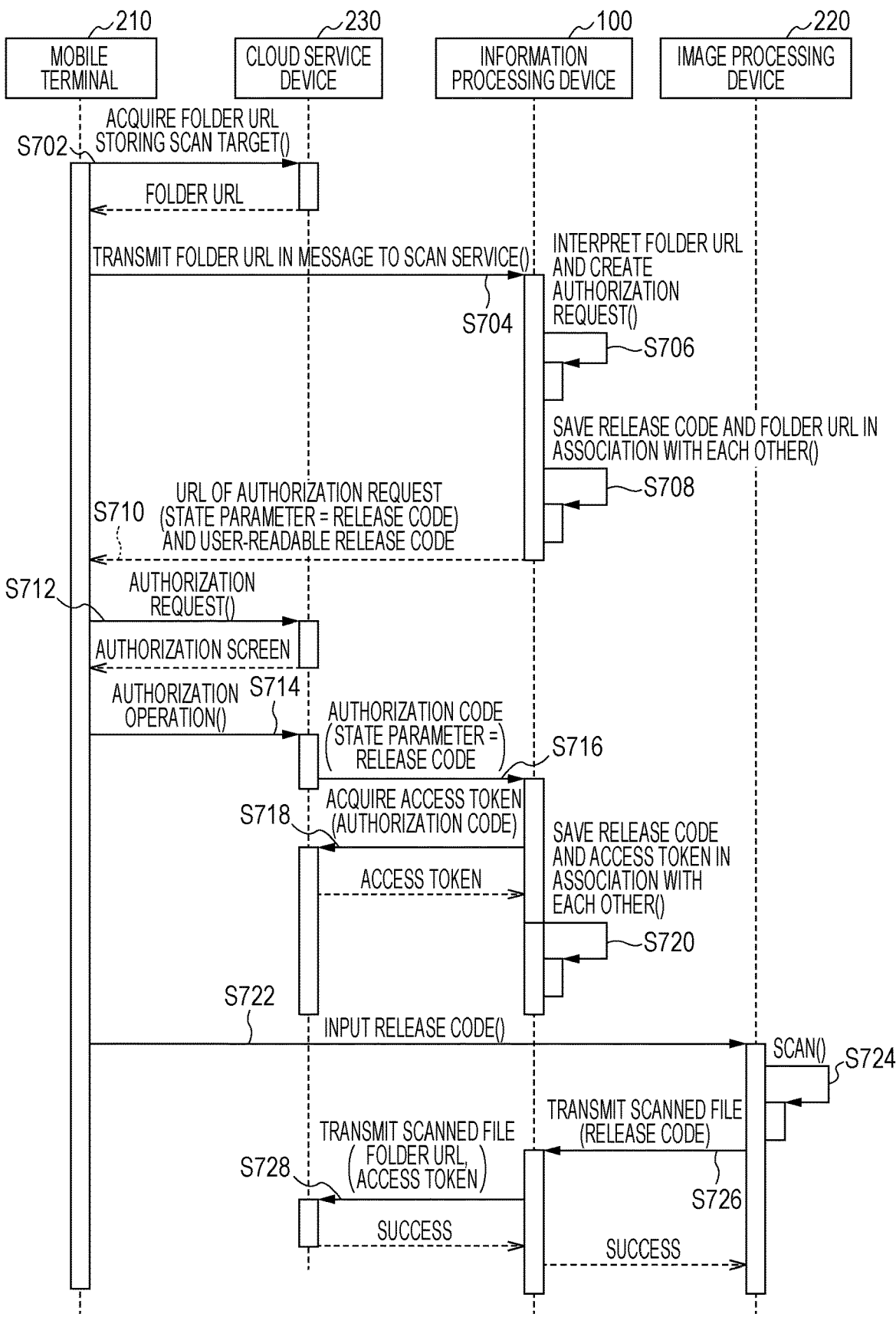
FIG. 7 is a flowchart illustrating an example of a process according to an exemplary embodiment.

FIG. 7 is a flowchart illustrating an exemplary process according to the exemplary embodiment. The process from step S702 to step S722 is similar to the process from step S402 to step S422 illustrated in the example of FIG. 4. Note that, as discussed earlier, the URL means the storage location of a scanned document image (also called a scanned file). Mostly, the process from step S724 differs from the flowchart illustrated in the example of FIG. 4.

In step S702, the mobile terminal 210 acquires from the cloud service device 230 a folder URL, which is a URL indicating the folder (also referred to as a directory, collection, or the like) storing the scan target.

In step S704, the mobile terminal 210 transmits the folder URL acquired in step S702 to the information processing device 100 by using a message directed at the scan service.

In step S706, the information processing device 100 interprets the folder URL to create an authorization request.

In step S708, the information processing device 100 saves the release code and the folder URL in association with each other in the access token saving table 300.

In step S710, the information processing device 100 transmits the URL of the authorization request (with the release code set in a state parameter) and a user-readable release code to the mobile terminal 210.

In step S712, the mobile terminal 210 transmits the authorization request to the cloud service device 230, and displays an authorization screen. Specifically, accessing the URL of the authorization request in response to a user operation corresponds to transmitting the authorization request, and as a result, an authorization screen is displayed in the browser.

In step S714, the mobile terminal 210 performs an authorization operation with respect to the cloud service device 230, in response to a user operation. Herein, the action to be authorized is the storage, by the information processing device 100, of the file in the storage location inside the cloud service device 230.

In step S716, the cloud service device 230 transmits an authorization code (with the release code set in a state parameter) to the information processing device 100.

In step S718, the information processing device 100 acquires an access token (authorization code) from the cloud service device 230.

In step S720, the information processing device 100 saves the release code and the access token in association with each other in the access token saving table 300.

In step S722, the mobile terminal 210 or the user of the mobile terminal 210 inputs the release code into the image processing device 220.

In step S724, the image processing device 220 scans a document and generates a scanned file.

In step S726, the image processing device 220 transmits the scanned filed and a transmission request (with the release code included) to the information processing device 100.

In step S728, the information processing device 100 uses the access token saving table 300 to extract the folder URL and the access token corresponding to the release code acquired in step S726. The information processing device 100 uses the folder URL and the access token to transmit the scanned file to the cloud service device 230. Subsequently, when the scanned file is stored in the image processing device 220, information indicating that the scanned file was stored successfully is transmitted from the cloud service device 230 to the information processing device 100, and from the information processing device 100 to the image processing device 220. The image processing device 220 may also display an indication that storage has finished.

Note that in the case in which a file is updated to a new version or replaced, for example, the folder URL may be substituted with a file URL. Also, it may be determined whether the URL is a file URL or a folder URL, and if the URL is a file URL, the file may be updated to a new version or replaced, for example, whereas if the URL is a folder URL, the file may be stored in that folder.

An exemplary hardware configuration of an information processing device according to an exemplary embodiment will now be described with reference to FIG. 8. The configuration illustrated in FIG. 8 may be realized by a personal computer (PC), for example, and illustrates an exemplary hardware configuration equipped with a data reading unit 817 such as a scanner, and a data output unit 818 such as a printer.

The central processing unit (CPU) 801 is a controller that executes processing according to a computer program that states execution sequences for the various modules described in the exemplary embodiment discussed in the foregoing, or in other words, for respective modules such as the print service processing module 105, the authorization request URL publishing module 110, the release code publishing module 120, the access token saving module 130, the file acquiring module 140, and the communication module 190.

The read-only memory (ROM) 802 stores information such as programs and computational parameters used by the CPU 801. The random access memory (RAM) 803 stores information such as programs used during execution by the CPU 801, and parameters that change as appropriate during such execution. These memory units are connected to each other by a host bus 804 realized by a CPU bus, for example.

The host bus 804 is connected to an external bus 806 such as a Peripheral Component Interconnect/Interface (PCI) bus via the bridge 805.

The keyboard 808 and the mouse or other pointing device 809 are devices operated by a user. The display 810 may be a liquid crystal display (LCD) or cathode ray tube (CRT) device, and displays various information as text and image information. Additionally, a device such as a touchscreen equipped with the functions of both the pointing device 809 and the display 810 is also acceptable.

The hard disk drive (HDD) 811 houses and drives a hard disk (which may also be flash memory or the like), causing programs executed by the CPU 801 and information to be recorded thereto or retrieved therefrom. The hard disk realizes the functions of modules such as the access token storage module 150. Additionally, information such as various other data and various computer programs are stored therein.

The drive 812 reads out data or programs recorded onto a removable recording medium 813 such as an inserted magnetic disk, optical disc, magneto-optical disc, or semiconductor memory, and supplies the data or programs to the RAM 803 connected via the interface 807, the external bus 806, the bridge 805, and the host bus 804. Note that the removable recording medium 813 is also usable as a data recording area.

The connection port 814 is a port that connects to an externally connected device 815, and has a USB, IEEE 1394, or similar receptacle. The connection port 814 is connected to the CPU 801 via the interface 807, the external bus 806, the bridge 805, and the host bus 804. The communication unit 816 is connected to a communication link and executes data communication processing with external equipment. The data reading unit 817 may be a scanner, for example, and executes document scanning processing. The data output unit 818 may be a printer, for example, and executes document data output processing.

Figure 8:
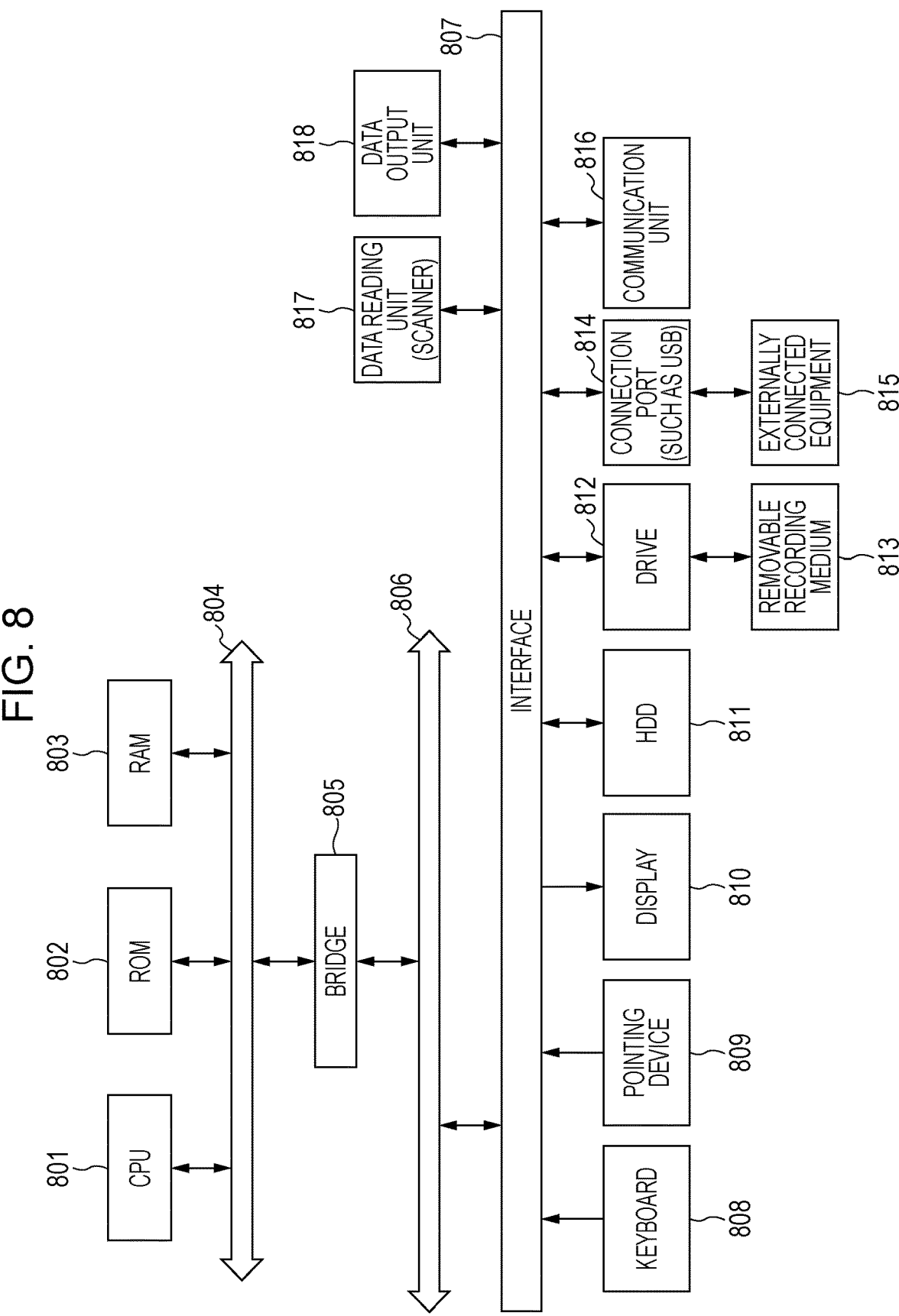
FIG. 8 is a block diagram illustrating an exemplary hardware configuration of a computer that realizes an exemplary embodiment.

Note that the hardware configuration of an information processing device illustrated in FIG. 8 illustrates a single exemplary configuration, and that the exemplary embodiment is not limited to the configuration illustrated in FIG. 8 insofar as the configuration still enables execution of the modules described in the exemplary embodiment. For example, some modules may also be realized with special-purpose hardware (such as an application-specific integrated circuit (ASIC), for example), and some modules may be configured to reside within an external system and be connected via a communication link. Furthermore, it may also be configured such that multiple instances of the system illustrated in FIG. 8 are connected to each other by a communication link and operate in conjunction with each other. Additionally, besides a personal computer in particular, an exemplary embodiment may also be incorporated into a device such as a mobile information/communication device (including devices such as a mobile phone, a smartphone, mobile equipment, and a wearable computer), information appliance, robot, photocopier, fax machine, scanner, printer, or multi-function device (that is, an image processing device having two or more from among scanning, printing, copying, and faxing functions).

The exemplary embodiment discussed above illustrates an example in which the URL indicates the storage location of a file, but the URL may also be a folder URL. In this case, when the release code is input into the image processing device 220, a list of the contents of the folder is displayed, and the target file is specified from the list.

In the exemplary embodiment discussed above, the user-readable URL is transmitted in step S410, but the user-readable URL may also be displayed on a redirect screen after step S420. In this case, the release code is in a usable state from the moment the user first learns the release code.

As the access token saving table 300, the access token may also be stored in association with an email address or SNS account. This process may be conducted in step S408. In this case, from the second time onward, the file may be printed without going through the authorization flow.

Note that the described program may be provided stored in a recording medium, but the program may also be provided via a communication medium. In this case, a computer-readable recording medium storing a program, for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

The recording medium may be a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), or a Secure Digital (SD) memory card, for example.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), the Internet, an intranet, an extranet, or some combination thereof, or alternatively, by being modulated onto a carrier wave and propagated.

Furthermore, the above program may be part or all of another program, or be recorded to a recording medium together with other separate programs. The above program may also be recorded in a split manner across multiple recording media. The above program may also be recorded in a compressed, encrypted, or any other recoverable form.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device, comprising:
one or more hardware processors configured to:
receive, from a terminal device, first information indicating a storage location of a document, on a cloud server, to be printed;
use the first information to generate an authorization request, generate second information corresponding to the authorization request, and transmit the authorization request and the second information to the terminal device;
receive, from the cloud server, an access authorization information corresponding to the authorization request;
store the access authorization information, the second information, and the first information in association with each other;
receive the second information from an image processing device;
access the storage location of the cloud server using the access authorization information and the first information corresponding to the second information;
obtain the document from the cloud server; and
transmit the document to the image processing device.

2. An information processing device, comprising:
one or more hardware processors configured to:
receive, from a terminal device, first information indicating a storage location, on a cloud server;
use the first information to generate an authorization request, generate second information corresponding to the authorization request, and transmit the authorization request and the second information to the terminal device;
receive, from the cloud server, an access authorization information corresponding to the authorization request;
store the access authorization information, the second information, and the first information in association with each other;
receive the second information from an image processing device;
access the storage location of the cloud server using the access authorization information and the first information corresponding to the second information; and
receive a document from the image processing device, and transmit the document to the storage location of the cloud server.

3. An information processing system, comprising:
the information processing device according to claim 1, wherein receive, from a terminal device, first information indicating a storage location of a document, on a cloud server, to be printed;
use the first information to generate an authorization request, generate second information corresponding to the authorization request, and transmit the authorization request and the second information to the terminal device;
receive, from the cloud server, an access authorization information corresponding to the authorization request;
store the access authorization information, the second information, and the first information in association with each other;
receive the second information from an image processing device;
access the storage location of the cloud server using the access authorization information and the first information corresponding to the second information;
obtain the document from the cloud server; and
transmit the document to the image processing device; and
an image processing device, wherein the image processing device includes at least one processor configured to:
receive the second information by an operation performed by user or from the terminal device;
transmit the second information to the information processing device; and
receive the document from the information processing device, and print the document.

4. An information processing system, comprising:
the information processing device according to claim 2, wherein receive, from a terminal device, first information indicating a storage location, on a cloud server;
use the first information to generate an authorization request, generate second information corresponding to the authorization request, and transmit the authorization request and the second information to the terminal device;
receive, from the cloud server, an access authorization information corresponding to the authorization request;
store the access authorization information, the second information, and the first information in association with each other;
receive the second information from an image processing device;
access the storage location of the cloud server using the access authorization information and the first information corresponding to the second information; and
receive the document from the image processing device, and transmit the document to the storage location of the cloud server; and
an image processing device, wherein the image processing device includes at least one processor configured to:
receive the second information by an operation performed by user or from the terminal device;
transmit the second information to the information processing device; and
process the document image data, and transmit the document image data to the information processing device.

5. A non-transitory computer readable medium storing a program causing a computer to execute a process for processing information, the process comprising:
receiving, from a terminal device, first information indicating a storage location of a document, on a cloud server, to be printed;
using the first information to generate an authorization request, generate second information corresponding to the authorization request, and transmit the authorization request and the second information to the terminal device;
receiving, from the cloud server, an access authorization information corresponding to the authorization request;
storing the access authorization information, the second information, and the first information in association with each other;
receiving the second information from an image processing device;
accessing the storage location of the cloud server using the access authorization information and the first information corresponding to the second information;
obtaining the document from the cloud server; and
transmitting the document to the image processing device.

6. A non-transitory computer readable medium storing a program causing a computer to execute a process for processing information, the process comprising:
- receiving, from a terminal device, first information indicating a storage location, on a cloud server;
- using the first information to generate an authorization request, generate second information corresponding to the authorization request, and transmit the authorization request and the second information to the terminal device;
- receiving, from the cloud server, an access authorization information corresponding to the authorization request;
- storing the access authorization information, the second information, and the first information in association with each other;
- receiving the second information from an image processing device;
- accessing the storage location of the cloud server using the access authorization information and the first information corresponding to the second information;
- receiving a document from the image processing device; and
- transmitting the document to the storage location of the cloud server.

* * * * *